Aug. 25, 1936.   O. W. LEE   2,051,996
OPHTHALMIC MOUNTING
Filed Sept. 28, 1934   2 Sheets-Sheet 1
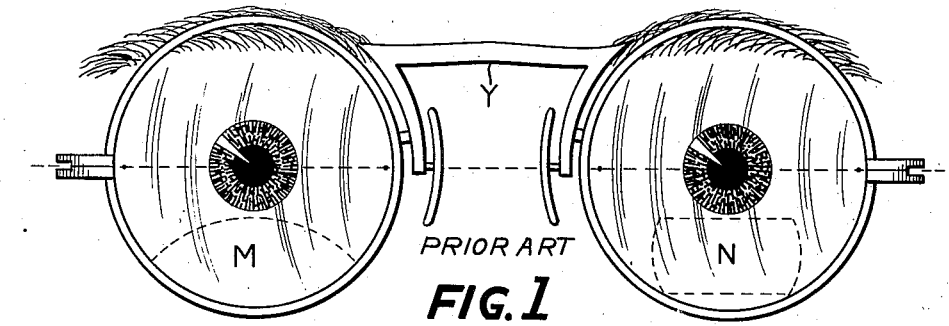
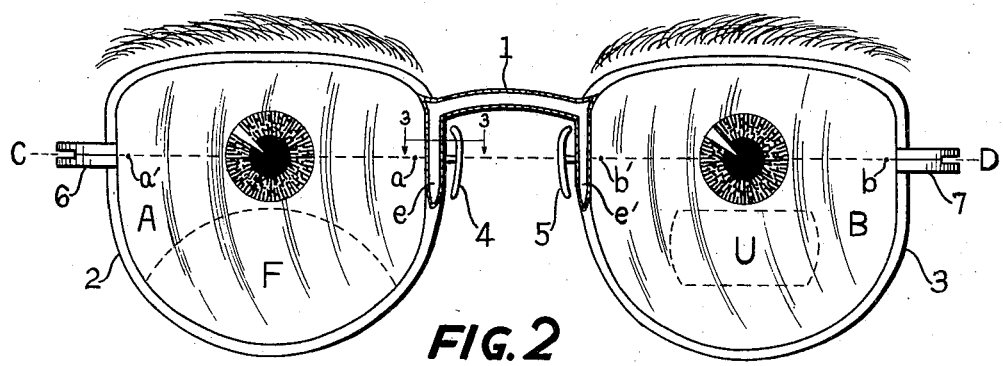
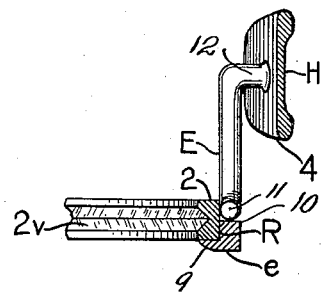
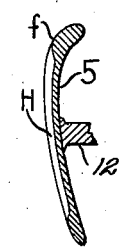
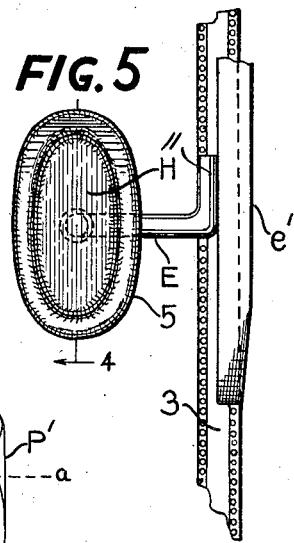
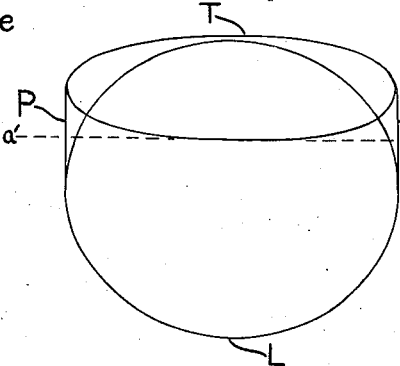
INVENTOR
Orval W. Lee Aug. 25, 1936.   O. W. LEE   2,051,996
OPHTHALMIC MOUNTING
Filed Sept. 28, 1934   2 Sheets-Sheet 2

INVENTOR
Orval W. Lee

Patented Aug. 25, 1936

2,051,996

UNITED STATES PATENT OFFICE 2,051,996

OPHTHALMIC MOUNTING

Orval W. Lee, Spokane, Wash.

Application September 28, 1934, Serial No. 745,876

16 Claims. (Cl. 88—42)

My present invention relates to improvements in an ophthalmic mounting or spectacle frame for eyeglasses. The invention involves the principle of adapting the mechanical features of spectacle wear to the anatomical condition of the face of the wearer and in improved construction that greatly enhances the rigidity of the frame or mounting, thereby maintaining the lenses in proper alignment with relation to the eyes of the wearer.

The improvements may be adapted to various forms of spectacles or eyeglass wear, thus affording a variety of styles for individual tastes.

Means are provided for positioning the lenses with relation to the eyes, whereby the major portions of the lenses are in the most serviceable position for practical use.

The invention resides in certain novel constructions, combinations and arrangements of parts as will hereinafter be more fully set forth and claimed. It will be understood that the invention is not restricted to the exact structure herein illustrated and described, but that modifications may be made in the disclosed structure without departing from the principles of the invention and the intent of the claims. In the accompanying drawings I have illustrated one preferred example of the physical embodiment of my invention.

Figure 1 shows a frame of the prior art, in position before the eyes.

Figure 2 shows a frame embodying the principles of my invention, in position before the eyes.

Figure 3 shows a greatly enlarged sectional view taken on the line 3, 3 of Figure 2, disclosing the concealed joint of my improved construction and includes a sectional view of my improved guard, disclosing the depression in the same.

Figure 4 shows the longitudinal curvature of my improved guard in vertical section taken on the line 4 of Figure 5.

Figure 5 shows a greatly enlarged view of my improved method of joining the parts of the frame and also includes a face view of my improved guard.

Figure 7:
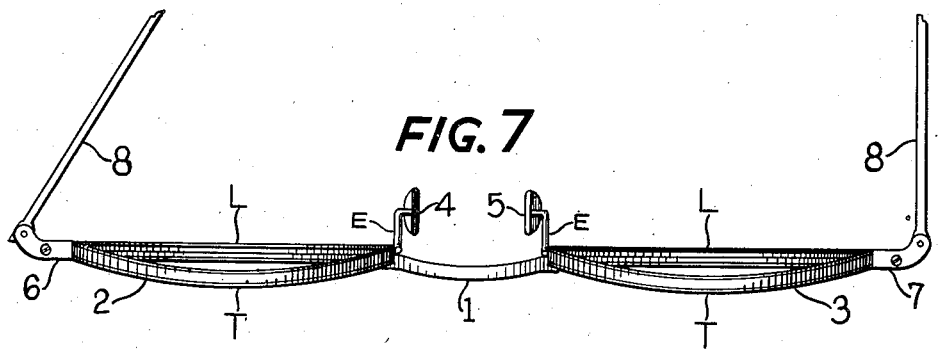

Figure 6 diagrammatically shows the improved shape or contour of the lenses or frame.

Figure 7 shows a top view of my improved frame, with part of the temple bars broken away and discloses the forward arch of the top of each rim.

The essential parts of the frame of my invention are illustrated in Figure 2, wherein the lens A is held in the rim 2 and the lens B is held in the rim 3, these rims are connected by the centerpiece 1, the paired guards 4 and 5 serve for supporting the frame upon the nose and endpieces 6 and 7 are provided at the opposite extreme sides of the frame for pivotal attachment of the temples shown in fragment at 8 in Figure 7.

The above terms are conventional in the art to which the invention belongs and it is generally understood that the term frame front, or front, refers to the frame or mounting exclusive of the temples, the latter term is generally understood to refer to the paired bars that are pivoted or hinged to the endpieces and extend rearwardly, to fit in various modes, over the ears of the wearer; when the centerpiece saddles the nose thereby supporting the frame, it is properly referred to as the bridge. These conventional terms are used in their defined sense throughout the specification.

In Figure 2 the mechanical axis of the lens A is indicated by the dotted line between the points $a'$, $a$; and the mechanical axis of the lens B is indicated by the dotted line between the points $b'$, $b$; the mechanical axis of the frame is indicated by the line C D, which coincides with the mechanical axes $a'$ $a$ and $b'$ $b$ of the lenses. It is essentially important that the mechanical axis of both the frame and lenses should coincide, otherwise the alignment of the lenses in the frame would be guesswork. The mechanical axis of each lens is the horizontal diameter from which the axis of the cylindrical element of the lens should be accurately rotated to correct position. The shape or contour of the lens is also formed upon this mechanical axis and necessarily the mechanical axis of the frame and lenses should coincide. In completed glasses, the points $a'$, $a$, $b'$ and $b$ of the lenses should be situated in a straight line and when the mechanical axis of the frame does not coincide with the mechanical axis of the lenses, the oculist or optometrist is dependent upon the employees of the dispensing optician for proper alignment of the points $a'$, $a$, $b'$ and $b$, which at best is only approximate.

As shown in Figure 2 the mechanical axis C D of the frame is properly a horizontal line drawn through the two endpieces 6, 7 and the points of attachment of the guards 4 and 5. This attribute facilitates adjusting the frame to proper alignment when required for any reason and the mechanical axis of the lenses being coincident with the mechanical axis of the frame they are simultaneously aligned. In the absence of this mechanical requisite, inconvenience and a waste of time attend said adjustment. It should be understood that the mechanical axis of the lenses and frame is not synonymous with a line drawn horizontally through the center of the pupils of the eyes of the wearer and that the proper positioning of the mechanical axis with relation to said interpupillary line is a matter requiring the personal skill of the oculist or optometrist.

As shown in Figures 3 and 5, each of the aforementioned guards is attached to the frame front by means of a guard-arm E; this construction permits of ample adjustment for widening the interval space between the guards and also permits the guards to be angled upon the vertical axis or the horizontal axis or both as required. As seen in Figures 3, 5, and 7, the adjustment of the guards is not obstructed by other rearwardly extending parts. The separation between the rims 2 and 3 and consequently the separation between the guards 4 and 5, may be made in several sizes to accommodate different anatomical conditions.

Normally, the eyes rotate in the orbits: 50 degrees outward, 55 degrees inward, 33 degrees upward and 50 degrees downward. Most vocations require rotating the eyes downwardly a majority of the time. Obviously, the aforementioned anatomical functions and practical needs make it advisable that the major portion of the lenses be situated below the interpupillary line of the normal eye-level.

As shown in Figure 2, the frame of my invention has the major portion of the lenses situated below the mechanical axis of the frame and lenses. In the absence of such provision it is often necessary to displace the entire frame downward upon the face of the wearer. Mechanical difficulties often limit such downward displacement with the result that, as is shown in Figure 1, a portion of the lenses extends above the eyebrows and is consequently useless as well as of unpleasing appearance when on the face of the wearer.

In carrying out my invention I provide a means for mounting ophthalmic lenses, whereby the lenses may be properly positioned before the eyes of a person so that the maximum utility may be gained from all parts of the lenses.

Figure 2 shows the shape or contour of the lenses best adapted to maximum utility and it will of course be understood that the lenses and frame are necessarily of the same shape or contour when assembled together. As best seen in Figure 6, my improved shape consists of two perpendicular parallel edges P, P', tangent to an elongated, horizontal, semi-elliptical top T and tangent to a broad semi-elliptical bottom L. The edges P and P' being tangent to the bottom L and the top T, there are no angular bends in the rims of the frame and consequently the difficulty of fitting the lenses to an angular contour is avoided and the consequent chipping of the lenses is likewise avoided. The arch of the semi-elliptical top T approximates the contour of the eyebrows and is of sufficient curvature to facilitate the rim being drawn in close contact with the lens, as is difficult in frames having a straight top or angular bends.

As shown in Figure 7 the top T of each rim is also curved forward to accommodate the section of each lens resulting from the greater cut at the top than at the bottom. It should also be noted that this forward curving of the top of the rim is and lenses further conforms to the forward arch of each eyebrow. The described shape of the lenses and rims, provides for positioning the spectacles or eyeglasses in close proximity to the eyes without the top of the lenses or frames touching the brow.

As shown in Figure 2 the centerpiece 1 is provided with two, laterally spaced, downwardly projecting parts e and e'. The projections e and e' are each forwardly provided with a laterally disposed flange 9, the projection proper forms a rearwardly disposed flange 10, and these two flanges cooperate to form a recess or rabbet R to receive the rim as is shown in the enlarged sectional view of Figure 3. In this figure a fragment of the inside bevel of the rim is shown at 2v and a section of the same is indicated at 2, the downward projection e of the centerpiece is shown with a right-angled recess R to receive the flat rim shown in section at 2. It will of course be understood that said recess may be of any shape complementary to the section of the rim. The centerpiece 1 is attached to the rim by means of the downward projections e and e'; the attachment extends the full length of the downward projections and abuts the forward surface of the rims as well as the lateral edge or periphery of the same. This construction is much more rigid and secure than the various methods generally employed and consequently the frame of my invention will remain in proper alignment under severe usage that would readily distort other frames. It is of course understood that these parts are permanently joined in the customary manner appropriate for whatsoever material of which they may be made.

As shown in Figure 3, the dimension of the flange 9 is the same as the thickness of the rim 2; and preferably, the inside dimension of the recess or rabbet R formed in the projection e is less than the peripheral width of the rim 2, whereby the angle formed by the rear edge of the flange 10 and the periphery of the rim 2 provides a ledge or recess to receive the upturned end 11 of the guard-arm E which is securely joined to both the flange 10 of the projection e and to the peripheral surface of the rim 2 as illustrated in Figure 3 and Figure 5. It will be readily apparent that this construction assures a much firmer attachment on the two surfaces than is afforded by the usual attachment on a single surface. It is common knowledge that guard-arms, bridges and centerpieces joined to a single surface give no small amount of annoyance because of the liability of the parts to separate under the usual conditions to which they are necessarily subjected in use and it will be readily appreciated that the construction disclosed provides a manner of joining the three parts so that each one is joined to the other two. This double joining affords a sturdy durable construction with a minimum thickness of the parts and consequent lightness of weight which is highly desirable.

As shown in Figure 2 the described method of construction conceals all joints when the frame is in position upon the face of the wearer. Furthermore, the right-angled union of the centerpiece with the rims makes it possible to reduce the thickness of the rims and the downward projections of the centerpiece appreciably and at the same time attain a more rigid construction than is provided by other methods in general use.

The described construction consumes but a minimum of space and permits the lenses to be placed closer together than is possible with various other forms of construction. The amount of space thus conserved may be utilized by increasing the horizontal dimension of the lenses and thereby enhancing the field of vision obtainable through the lenses. This increased size of lens is of utmost advantage both in cases where the interpupillary distance is narrow and in cases where extra width between the temples is required.

My preferred form of guard is illustrated at 5 in the greatly enlarged drawing of Figure 5 and consists of a small padlike appliance in the shape of a short, broad ellipse and is of lesser length than is generally used. The edges of the guard are rounded, that is to say the surface in contact with the nose, curves away from the nose at the margin of the guard. Preferably, the central portion of the contact side of the guard is provided with a depression H of substantial size, to engage the skin of the nose and prevent the guard from slipping from its proper position. As best seen in the sectional views of Figures 3 and 4 the edges of the depression H are rounded to prevent irritation of the skin.

Preferably, the longitudinal curvature of the guard should approximate the curve of the nose at the point of contact. My experiments and experiences have shown that the curvature, illustrated in Figure 4, is most practical. As shown in this figure the guard is curved on its longitudinal dimension, with exaggeration of the curve at the upper part, as indicated at f. This shape most nearly conforms to the contour of the nose in the region of the junction of the frontal, nasal and supramaxillary bones, which is the proper place of contact for the guards. The size of the guards is important and preferably they should be about six or seven millimeters wide and ten or twelve millimeters long.

The guard-arms E are of the simplest form possible, each extends rearwardly the required distance, then angles towards the nose as indicated at 12, and the terminal end is attached to the guard, as shown in Figure 3 and Figure 4, where it will be seen that the guard is disposed transverse of the terminal end of the guard-arm and that this terminal end is attached midway of the width of the guard. It is the general custom to make guard-arms of S-shape, or spiral form, or with other bends or shapes, consequently there is an excess of material that is not required except in unusual cases which require the straightening of these otherwise needless bends, which are unsanitary because of the epithelial exfoliation and sebaceous secretions that collect between them. For these good and sufficient reasons I employ straight guard-arms with a choice of "long" or "short" length as required. These straight guard-arms may readily be adjusted to the required angles or bends, without the inconvenience of straightening out needless bends.

The guard-arms are shown rigidly attached to the guards, whereby the adjusted angle is rigidly maintained. They may also be attached by a rocking joint in any commercially practical manner.

To illustrate the practical application and use of the improved frame of my invention, in Figure 2, I show a bifocal segment U appropriately located with relation to the eye; there is ample room below the segment U to afford a view of curbs, stairs and similarly situated objects. In Figure 1, a like segment is shown similarly situated at N in a frame of the prior art, wherein no serviceable vision is obtainable below the segment N. In the same figure another bifocal segment is shown at M and in Figure 2, the same diameter of segment, similarly situated, is shown at F, wherein the frame of my invention provides for a much larger reading area, which is of advantage in certain occupations. It will be seen that the interpupillary distance is the same in Figures 1 and 2, the distance between the guards is likewise the same; the frame of my invention affords larger lenses and consequently greater width between temples, than does the prior art frame shown in Figure 1. It will also be seen that the frame of my invention does not necessitate the wide centerpiece shown at Y in Figure 1, which latter structure of the prior art has the objectionable feature of making the bridge of the nose appear abnormally broad. When properly positioned before the eyes of the wearer my improved frame is in proper position with relation to the brows of the wearer and the major portion of the lenses is situated below the interpupillary line of the eyes, in proper position for use when the eyes are directed downward, as is the case a majority of the time. The exaggerated curve of the upper part of the guards approximates the curvature of the nose at the position which the guards properly rest upon the sides of the nose and effectively prevents this portion of the guards from undue contact, whereby the guards are in uniform contact with the sides of the nose, as would not be the case if the principal contact was at the terminal ends as is often the case with the lesser curved guards of the prior art. The depression in each guard effectively engages the skin of the nose and maintains the guard in position. The depression is very shallow and the surface of the depression prevents the skin from protruding, as often occurs when perforated or loop guards are worn regularly. The guards present a well rounded surface at all points of contact which effectively prevents irritation of the skin.

Thorough familiarity with the requirements of the art convinces me that my invention provides much needed advantages that are not provided by any frame or mounting of the prior art. For persons with prominent, overhanging brows and a high nasal crest, the frame of my invention can readily be adjusted to proper position before the eyes, under conditions which would render impossible, the proper positioning of any frame or mounting of the prior art.

In the invention herein disclosed, what I claim as new and desire to secure by Letters Patent of the United States is:

1. A spectacle frame comprising a pair of rims, a member connecting said rims, an endpiece connected to the temporal portion of each rim, a temple pivoted to each endpiece, a guard-arm connected to the nasal portion of each rim, a guard carried by each guard-arm, said endpieces and said guard-arms disposed in a straight line considerably above the horizontal median of said rims, and the longest horizontal dimension of said rims being at said line of attachment.

2. A spectacle frame for ophthalmic lenses, comprising a pair of rims for holding the lenses, a centerpiece connecting said rims, said centerpiece having a pair of downward projections, a laterally disposed flange on the front of each of said projections, said downward projection and said flange forming a recess running full length of each downward projection, said rims rigidly secured within the respective recesses and the joined surfaces concealed by said flange, a pair of endpieces adapted to pivotally engage a pair of temple bars, a pair of guard-arms, each guard-arm attached to one of said downward projections and its corresponding rim, a guard on each guard-arm, said endpieces and guard-arms situated precisely on the mechanical axis of the frame and the coinciding mechanical axis of the lenses, the major portion of the lenses being situated below the mechanical axis of the frame, the aforementioned guards being adapted to align the mechanical axis of the frame and lenses with the interpupillary line at the normal eye-level.

3. A spectacle frame for ophthalmic lenses including a pair of connected rims, each rim having two perpendicular parallel sides, said sides being tangent to an elongated horizontal semi-elliptical top and also tangent to a broad semi-elliptical bottom, whereby said rims are devoid of angular bends; nose supporting means and a pair of endpieces attached to said rims, said points of attachment being in a straight line constituting the mechanical axis of the frame, the major portion of said rims being disposed below said mechanical axis of the frame, said nose supporting means being adapted to align said mechanical axis of the frame with the interpupillary line of the normal eye-level, whereby the major portion of the lenses is below the normal eye-level and serviceable for use when the line of vision is directed downward.

4. A spectacle frame comprising a pair of lens retaining rims, a member connecting said rims, an endpiece for each rim, each rim extending perpendicularly upward from its endpiece, then bent curvilinear inward in a horizontal arch, then bent perpendicularly downward, then bent curvilinearly outward in an inverted horizontal arch, then bent perpendicularly upward in alignment with the first mentioned perpendicular portion, said curvilinear bends tangently joining said perpendicular bends, a pair of guard-arms, said endpieces and said guard-arms disposed on a horizontal line considerably above the horizontal median of said rims and each joined to one of the perpendicular portions of said rims, a guard attached to each of said guard-arms, and a temple pivoted to each of said endpieces.

5. A frame or mounting for ophthalmic lenses including a pair of connected rims, each rim having two perpendicular parallel sides, said sides being tangent to an elongated horizontal semi-elliptical top and also tangent to a broad semi-elliptical bottom, whereby said rims are devoid of angular bends.

6. A frame or mounting for ophthalmic lenses including a pair of connected rims, each rim having two perpendicular parallel sides, said sides being tangent to an elongated horizontal semi-elliptical top and also tangent to a broad semi-elliptical bottom, whereby said rims are devoid of angular bends; and said rims arching forward of the vertical plane to accommodate the peripheral arch of similarly shaped lenses mounted therein.

7. A spectacle frame comprising a pair of lens retaining rims, a member connecting said rims, each rim circumscribing an area having a horizontal dimension exceeding its vertical dimension, and the top of each rim arched forward of the vertical plane thereof.

8. A frame or mounting for ophthalmic lenses comprising a centerpiece, a recess in each side of said centerpiece, a rim secured in each recess, the centerpiece overlapping the forward edge of each rim and being permanently attached to both the lateral and forward surfaces of each rim, the laterally attached portion of the centerpiece being narrower than the peripheral width of the rim and forming an angle therewith, a pair of guard arms attached rearwardly of the centerpiece one on either side, and each guard arm rigidly secured by double joining in the angle formed by the centerpiece and rim.

9. An ophthalmic mounting comprising a centerpiece formed with a pair of downward projections, each of said projections having a laterally disposed forward flange, a pair of rims, each of said flanges being permanently joined to the forward surface of one of said rims, the peripheral surface of each rim being also joined to one of said downward projections, the peripheral width of each rim extending rearwardly of each downward projection and forming an angle therewith, a pair of guard-arms, each guard-arm having a bent end positioned in said angle and permanently joined both to said downward projection and to said rim, and each guard-arm being provided with a nose guard.

10. An ophthalmic mounting comprising a centerpiece formed with a pair of downward projections, each of said projections having a laterally disposed forward flange, a pair of rims, each of said flanges being permanently joined to the forward surface of one of said rims, the peripheral surface of each rim being also joined to one of said downward projections, a pair of guard-arms, each guard-arm having a vertically bent end permanently joined both to said downward projection and to said rim, and each guard-arm being provided with a nose guard.

11. An ophthalmic mounting comprising a centerpiece formed with a pair of downward projections, each of said projections consisting of a laterally disposed forward flange and a rearwardly disposed flange, a pair of rims, each of said laterally disposed flanges being integrally joined to the forward surface of one of said rims and the peripheral surface of each rim being integrally joined to the respective rearwardly disposed flange, thereby to provide double joining completely concealed from front view.

12. A frame or mounting for ophthalmic lenses comprising a centerpiece embodying a pair of downward projections, each of said projections having a laterally disposed forward flange and a rearwardly disposed flange, a lens retaining member for each of said downward projections, each of said lens retaining members integrally joined to one of said laterally disposed forward flanges and to one of said rearwardly disposed flanges.

13. In a frame or mounting for ophthalmic lenses, a pair of guards for supporting the same upon the nose of the wearer, each guard comprising a small padlike appliance of short broad elliptical shape, said guards curved on their longitudinal dimension and said curve being exaggerated at the upper part of each guard to approximate the average anatomical contour of the nose in the region of the junction of the frontal, nasal and supramaxillary bones, and said guards being disposed considerably above the horizontal median of the lenses adapted to said frame or mounting, to thereby dispose the horizontal median of the lenses downwardly with respect to said guards.

14. In a frame or mounting for ophthalmic lenses, a pair of guards for supporting the same upon the nose of the wearer, each guard comprising a small padlike appliance consisting of an elliptical prominence surrounding a shallow depression, said guards being curved on their longitudinal dimension and said curve being exaggerated at the upper part of each guard to approximate the average anatomical contour of the nose in the region of the junction of the frontal, nasal and supramaxillary bones, and said guards being disposed considerably above the horizontal median of the lenses adapted to said frame or mounting, to thereby dispose the horizontal median of the lenses downwardly with respect to said guards.

15. In a frame or mounting for ophthalmic lenses, a pair of guards having a longitudinally curved surface indented with a shallow cavity occupying a substantial portion of the face of the guard, the margins of the guard and of said cavity being rounded to prevent abrasions of the skin and said guard being curved to approximate the average contour of the sides of the nose in the region of the junction of the frontal, nasal and supramaxillary bones, and said guards being disposed considerably above the horizontal median of the lenses adapted to said frame or mounting, to thereby dispose the horizontal median of the lenses downwardly with respect to said guards.

16. In a frame or mounting for ophthalmic lenses having guards for supporting the same upon the nose of the wearer, a pair of guard-arms, each guard-arm consisting of a vertically bent end rigidly attached to the frame or mounting and lying in the plane occupied by the lenses, a straight portion extending rearwardly from said attached end and terminating in a bent end extending towards the other guard-arm, a guard positioned transversely of the terminal end of each guard-arm and attached thereto at a point midway of the width of the guard.

ORVAL W. LEE.